United States Patent [19]

Strauss et al.

[11] 3,955,004

[45] May 4, 1976

[54] GLYCERIDE OIL TREATMENT WITH OXIDE AND BLEACHING EARTH

[75] Inventors: Hans Joerg Strauss, Hamburg; Achintya Kumar Sen Gupta, Schenefeld; Johannes Erich Rost, Hamburg, all of Germany

[73] Assignee: Lever Brothers Company, New York, N.Y.

[22] Filed: Aug. 16, 1974

[21] Appl. No.: 497,987

[30] Foreign Application Priority Data

Aug. 24, 1973 United Kingdom............... 40150/73

[52] U.S. Cl................................. 426/254; 426/610; 426/330.6; 260/427; 260/428; 260/428.5; 426/488

[51] Int. Cl.$^2$........................................... A23L 1/22

[58] Field of Search........... 426/253, 254, 261, 262, 426/321, 322, 330, 362, 330.6, 601, 478, 490, 495; 260/428.5, 420, 427, 425, 426, 428

[56] References Cited

UNITED STATES PATENTS 2,625,482 1/1953 Mattil................................ 426/362

FOREIGN PATENTS OR APPLICATIONS 865,807 4/1961 United Kingdom 990,704 3/1944 France

*Primary Examiner*—Norman Yudkoff
*Assistant Examiner*—Hiram H. Bernstein
*Attorney, Agent, or Firm*—Kenneth F. Dusyn; James J. Farrell; Melvin H. Kurtz

[57] ABSTRACT

The storage properties of edible oils are improved by first contacting the oil, in solution in a non-polar solvent, with a metal or metalloid oxide adsorbent in a column, and subsequently treating the oil with a bleaching earth after the solvent has been removed.

4 Claims, 5 Drawing Figures

GLYCERIDE OIL TREATMENT WITH OXIDE AND BLEACHING EARTH

BACKGROUND OF THE INVENTION

1. Field of the Invention

The present invention relates to a process for treating edible glyceride oils. More particularly, this invention relates to a process for treating edible glyceride oils to improve their storage properties, comprising treating edible glyceride oils with particular adsorbents and a bleaching earth in a determined sequence.

2. Description of the Prior Art

It is well-known that edible glyceride oils tend to develop "off-flavours" during storage, causing said oils to become less and less acceptable for edible purposes. To reduce the formation of off-flavours and to improve generally the storage properties of edible glyceride oil, it has therefore been common practice to subject the edible glyceridic oil to a refining treatment. However, even such edible oils may still show a tendency to form off-flavours, especially under prolonged storage conditions.

Various refining treatments are known in the art, the most common method being desliming, neutralisation, earth bleaching and steam deodorisation. However, particularly with glyceride oils which have already a strong unacceptable flavour of their own, such processes do not always yield an edible glyceride oil with satisfactory storage properties. It has now been found that by subjecting an edible glyceride oil first to a treatment with a suitable adsorbent, and subsequently to a treatment with a bleaching earth, significant improvements are achieved in the storage properties of the edible glyceride oil.

It has already been proposed in the art to treat edible glyceride oils with an adsorbent. Thus, British Patent Specification No. 865,807 describes a process for treating edible oils with activated alumina, in which process the oil is in solution in a non-polar solvent. The oil, preferably in unbleached condition, is passed through a column which contains the alumina, and subsequently deodorised with steam. Another proposal is given in French Patent Specification No. 990,704, according to which the oil, dissolved in a solvent, is passed through a column containing a silica gel. The oil may be a crude oil, or an oil which has undergone a bleaching treatment.

SUMMARY OF THE INVENTION

It has now been found that a significant and unexpected improvement is obtained in the storage stability of edible glyceride oils, treated in solution in a column containing an adsorbent such as silica gel or alumina, if the edible glyceride oil is subsequently bleached with a bleaching earth. Whereas the prior art teaches that the oil is treated with the adsorbent instead of the bleaching treatment with a bleaching earth, or bleached before said treatment with the adsorbent, it has now been found that a subsequent bleaching step gives unexpected advantages which are not obtained if the two treatments are carried out in reverse order, i.e. first bleaching and then treating the oil with an adsorbent.

DESCRIPTION OF THE PREFERRED EMBODIMENTS

Figure 1:
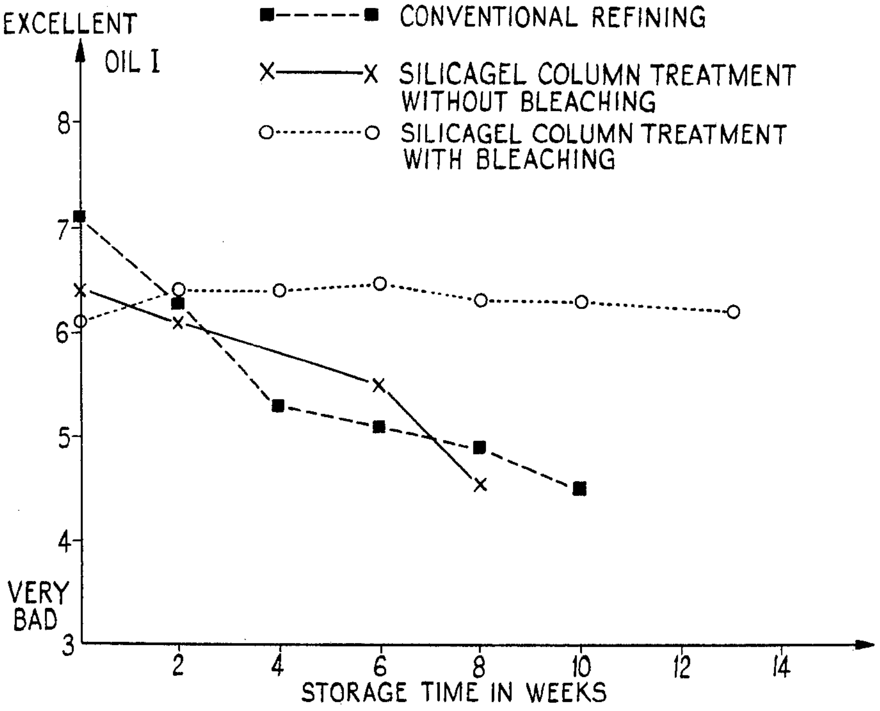
Figure 2:
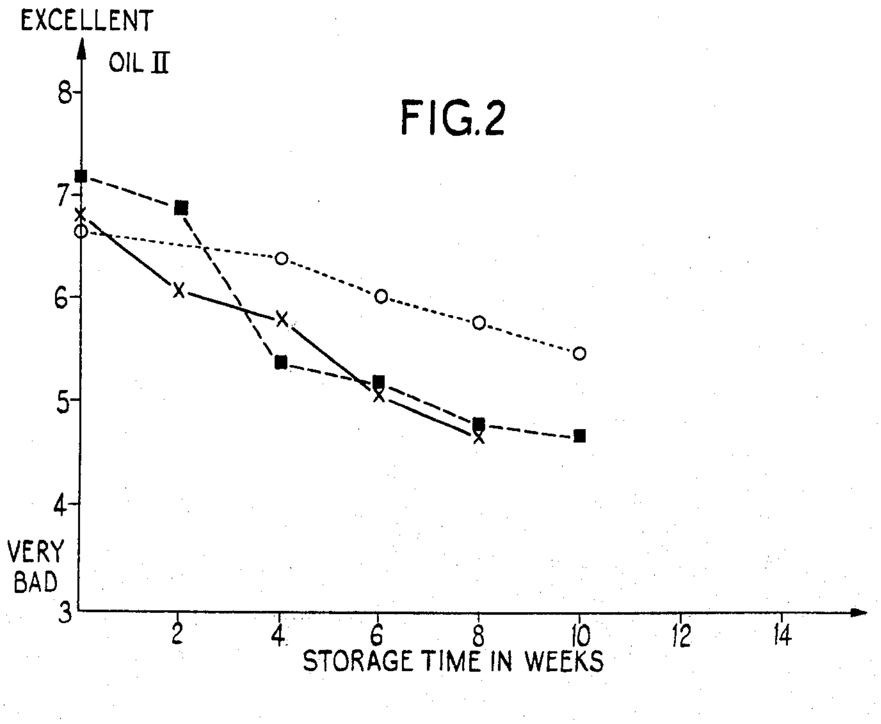
Figure 3:
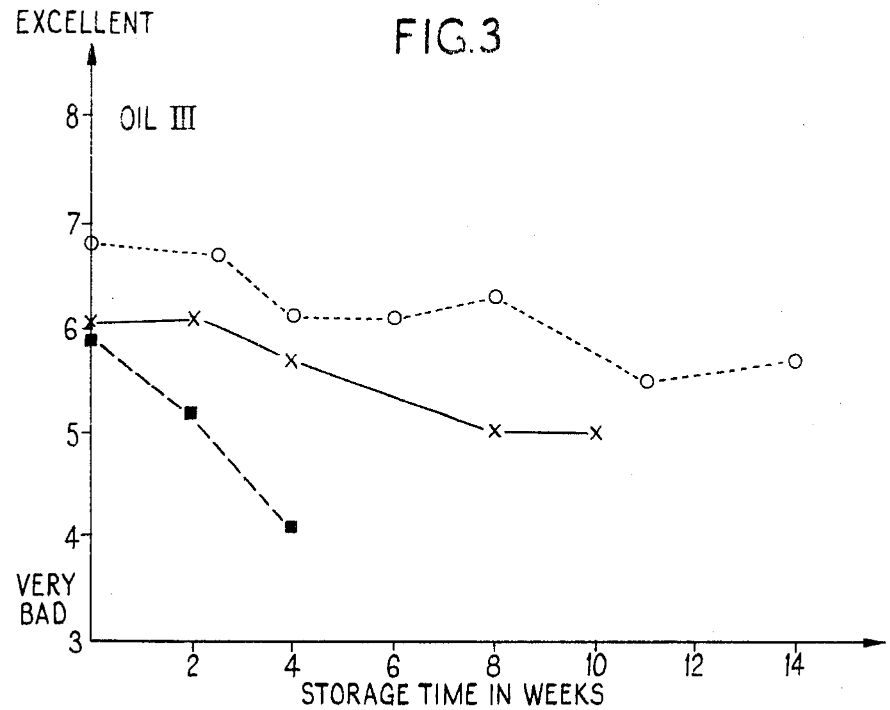
Figure 4:
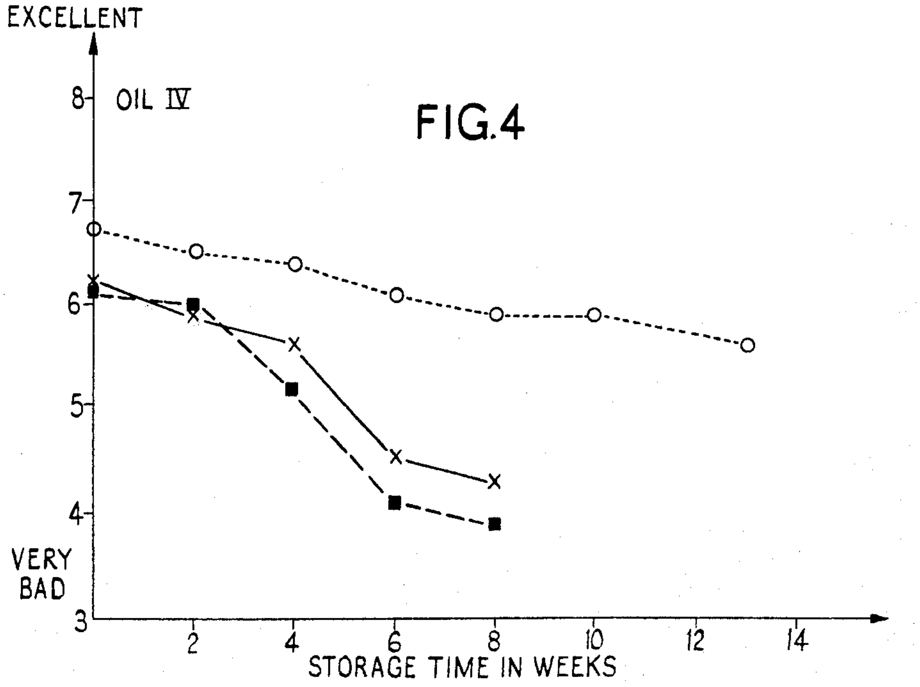

The present invention therefore relates to a process for treating edible glyceride oil to improve its storage properties, in which the edible glyceride oil, in solution in a non-polar solvent, is contacted with an adsorbent in a column containing the adsorbent, and is characterized in that the oil, after said treatment with the adsorbent, is treated with a bleaching earth.

The edible glyceride oils which can be treated according to the present invention are all the edible glyceride oils well-known in the oil and fat industry. Examples thereof are coconut, palm, palmkernel, marine, soyabean, linseed, rapeseed, sunflowerseed, safflower, cottonseed, grapeseed oil and so on.

The benefit of the present invention is particularly obtained with palm oil, soyabean oil and grapeseed oil. The edible glyceride oils can be treated in a crude form, i.e. in the form of a solution in a non-polar solvent, e.g. in the miscella, or they may already have undergone some pre-refining treatment. It is of advantage if the edible glyceride oils have been subjected to an alkai pre-refining step, in which the free fatty acids are neutralized.

It is essential that the edible glyceride oil should be in solution in a non-polar solvent when being treated with the adsorbent. Suitable non-polar solvents are petroleum fractions, pentane, hexane, cyclohexane, heptane and the like, including mixtures of various non-polar solvents. Particularly suitable is a petroleum fraction with a boiling point in the range of 63° – 71°C. The amount of solvent may vary from 10 – 95% by weight of the solution, and generally varies from 50 – 80% by weight of the solution.

As stated above, the edible glyceride oil, in solution in a non-polar solvent, is contacted with an adsorbent. Although this contacting could be carried out in a simple stirring or percolating process, sufficient contact time being the governing factor, advantageously and hence preferably the contacting is carried out in a column which contains the adsorbent, as e.g. described in British Patent Specification No. 865,807 and French Patent Specification No. 990,704.

The temperature at which the contacting may be carried out may vary widely. For most practical purposes the temperature will lie between 0° and 60°C, and preferably between 10° and 40°C.

The amount of adsorbent to be used is dependent upon a number of factors, e.g. pore size of the adsorbent, type of adsorbent, thickness of the layer in the column, throughput in the column, and so on. In general the ratio of oil to adsorbent varies between 0.3 : 1 and about 20 : 1. The adsorbent to be used in the present invention are metal oxides and metalloid oxides, particularly alumina and silica. Particularly silicas in the form of silica gels are especially suitable in the present invention. Mixtures of silicas and aluminas may also be used, as well as mixtures of silicas or aluminas with other adsorbents, provided the amount of silica or alumina is predominant.

The silica or alumina must neither be too fine nor too coarse. In general such silicas or aluminas are used which have an average pore size above 30 A, preferably between 50 and 2000 A. Suitable examples of aluminas and silicas to be used in the present invention are aluminas such as gibbsite or bayerite, and silicas such as silica gels known under the trade names Sorbsil (Joseph Crosfield and Sons, Warrington, UK) and Kieselgel M (Fa. Herrman, Cologne, Germany).

Other examples of suitable aluminas or silicas are Aluminiumoxid 504C (Fluka AG, Buchs, Switzerland), Kieselgel No. 7734 (E. Merck, Darmstadt, Germany)

and Silica Gel Type 62 (Grace GmbH., Bad Homburg v.d.H, Germany).

After contacting with the adsorbent, the edible glyceride oil is subjected to a treatment with bleaching earth. This treatment is carried out under the conditions for a bleaching treatment with a bleaching earth. Such conditions are: temperature generally from 50° to 120°C, pressure generally from 1 to 760 mm Hg, amount of bleaching earth generally from 0.05 to 5%.

Various usual types of bleaching earths may be used, mostly activated fuller's earth. Suitable examples are commercial products like Tonsil ACCFF, Tonsil 60 C (Fa. Südchemie, Munich, Germany), furthermore Fulmont C300 (Laporte Industries Ltd., Redhill, U.K.).

It has been found that in the process of the invention less bleaching earth is required than in conventional bleaching processes. Preferably the amount of bleaching earth is from 0.05 to 0.5%. The bleaching earth treatment may be carried out directly after the oil has been contacted with the adsorbent, or may be carried out after the oil has undergone further refining treatments such as desliming, neutralization and the like. The latter will take place e.g. when a crude oil is contacted with the adsorbent. In this respect it has been found that if silica gel is used as the adsorbent material, a pre-neutralization step is superfluous, as the silica gel adsorbs practically all free fatty acids present in the crude oil.

Silica gel has, moreover, the further advantage over e.g. alumina that it hardly adsorbs the tocopherols which are useful as antioxidants and vitamins in the edible glyceride oils.

It is essential that the treatment with bleaching earth is carried out when the solvent has been removed from the oil, e.g. by distillation. In carrying out the process of the invention clear edible glyceride oils are obtained with improved storage properties, particularly with regard to a significantly reduced tendency to form off-flavours on prolonged standing. In comparison with conventional refining treatments, the fatty acid composition of the glyceride oil remains practically unaltered and particularly the amount of essential fatty acids remains unchanged.

After the bleaching step the oil may further be subjected to all usual treatments to obtain edible oils suitable for particular purposes. It has been found that a subsequent deodorizing treatment, e.g. with steam, may further improve the colour and the storage properties of the oil. Hence a preferred embodiment of the present invention is a three-step process comprising treatment with adsorbent, treatment with bleaching earth and steam deodorization.

The present invention will further be illustrated by way of Example.

EXAMPLE I

Four samples of soyabean oil were used. Samples I – III had been subjected to an alkali neutralization and were used as a 25% hexane solution, Sample IV was a crude oil in miscella (abt. 30% oil in 70% hexane). These solutions were contacted with Kieselgel M (ex Fa. Herrmann, Cologne, Germany) which had an average pore size of 50 – 200 A, in a column. The column had a diameter of 12 cm, a height of 100 cm and a volume of 11.3 liters.

The silica gel was slurried in hexane and was allowed to stand for 1 hour. The column was half filled with hexane and the silica gel slurry was brought into the column. After closing the top of the column the oil in solution was pumped into the column at the bottom. The oil solution was kept at a temperature of 20°C and 50°C respectively, before feeding into the column by means of a heat exchanger. The jacket of the column was kept at the same temperatures. The residence time was 0.25 h., the through-flow 20 e/h.

At each column treatment various fractions were collected, which are characterized as follows:

| | oil/silica gel ratio (in kg/kg) |
|---|---|
| Sample I | 1.2 – 1.6 |
| Sample II | 1.3 14 1.6 |
| Sample III | 0.54 – 1.2 |
| Sample IV | 0.47 – 2.1 |

In all fractions no epoxytriglycerides could be determined. Complete adsorption of the epoxytriglycerides at the silica gel is an indication for the proper performance of the column treatment. After evaporation of the hexane the oils were bleached with 2% bleaching earth (Tonsil ACCFF ex Fa. Südchemie, Munich, Germany) for 20 minutes at 105°C/1 mm Hg. Thereafter the oils were deodorized for 5 hours at 180°C/1 mm Hg with 60% water. In the case of the crude oil (Sample IV) the column treatment was followed by a desliming process prior to the earth bleaching. The results of these experiments were as follows:

Appearance: all oils were colourless after the treatment.

Storage properties: 50 g samples of the treated oils were stored in the dark in 100 ml bottles with air head space.

The taste of the oils was assessed at regular intervals over a period of 14 weeks by a test panel consisting of 12 – 15 persons familiar with soyabean oil taste. A comparison was made between the oils treated according to the present invention, oils which had been conventionally refined and oils which had been treated with silica gel but without subsequent bleaching. The results are shown in FIGS. 1–4. These results clearly show a significant improvement of the oils treated according to the present invention.

EXAMPLE II

A sample of grapeseed oil was used. The oil had been subjected to a desliming treatment with water, an alkali neutralization and a soda-waterglass boiling. After filtration 560 g oil were dissolved in 1120 ml hexane. This solution was contacted with Kieselgel M (ex Fa. Herrmann, Cologne, Germany) which had an average pore size of 50 – 200 A, in a column. The column had a diameter of 6 cm, a height of 50 cm and a volume of 1.4 liters.

140 g silica gel were slurried in hexane and allowed to stand for 1 hour. The column was half filled with hexane and the silica gel slurry was brought into the column. After the level of the hexane was lowered to the level of the silica gel, the grapeseed oil solution was brought into the column. It passed through the silica gel within 4 hours. The process was kept at a temperature of 20°C. The yield of the silica gel treated oil was increased up to 93% by washing the silica gel with fresh hexane. After evaporation of the solvent the oil was subsequently bleached with 2% bleaching earth (Tonsil ACCFF ex Fa. Südchemie, Munich, Germany) for 20 minutes at 105°C/1 Hg. Thereafter the oil was deodorized for 5 hours at 210°C/1 mm Hg with 60% water.

Appearance: the oil was almost colourless
Lovibond colour in a 2 inch cell: 2 yellow
Storage properties: 50 g samples of the treated oils were stored in the dark in 100 ml bottles with air head space.

The taste of the oil was assessed at regular intervals over a period of 14 weeks by a test panel consisting of 12 – 15 persons.

A comparison was made between the oil treated according to the present invention and the oil which had been conventionally refined, i.e. without silica gel treatment. The taste of the fresh deodorized oil treated according to the present invention was excellent. The keeping quality of the silica gel refined grapeseed oil was satisfactory for more than 8 weeks.

The appearance of the conventionally refined grapeseed oil was an intensive green. The Lovibond colour in a 2 inch cell was 40 yellow, 0.3 red, 9 blue. The taste of this oil was objectionable already after deodorization. These results clearly show a significant improvement of the oil treated according to the present invention.

EXAMPLE III

Four experiments were carried out with soyabean oil, in which the order of the treatment with the adsorbent and the bleaching earth was varied.

The treatment with the adsorbent in the column was carried out both in the presence as well as in the absence of a solvent, as was the bleaching treatment.

The conditions for the treatment with the adsorbent in the column were:

adsorbent: silicagel as in Example I
temperature: 22°C
ratio oil/silicagel: 100:25 parts by weight in the case of the treatment in miscella, 500 g oil were dissolved in 1166 g hexane.

The conditions for the treatment with bleaching earth were:

bleaching earth: Tonsil ACCFF as in Example I
temperature: 105°C
pressure: 1 mm Hg
time: 30 min.
ratio oil/bleaching earth: 100:2 parts by weight.

In the case of the treatment in miscella, the miscella was stirred under reflux conditions for 30 minutes at 65°C. The miscella consisted of 1166 g hexane and 500 g oil.

The order of the treatments was as follows:

A: miscella silicagel treatment, then bleaching
B: miscella silicagel treatment, then miscella bleaching
C: bleaching treatment, then miscella silicagel treatment
D: miscella bleaching treatment, then miscella silicagel treatment The thus treated oils were stored and assessed as to their taste in the manner as described in Example I. An oil with acceptable properties should have an initial assessment of >6, and should have an assessment after 10 weeks' storage of not significantly less than 5.

Figure 5:
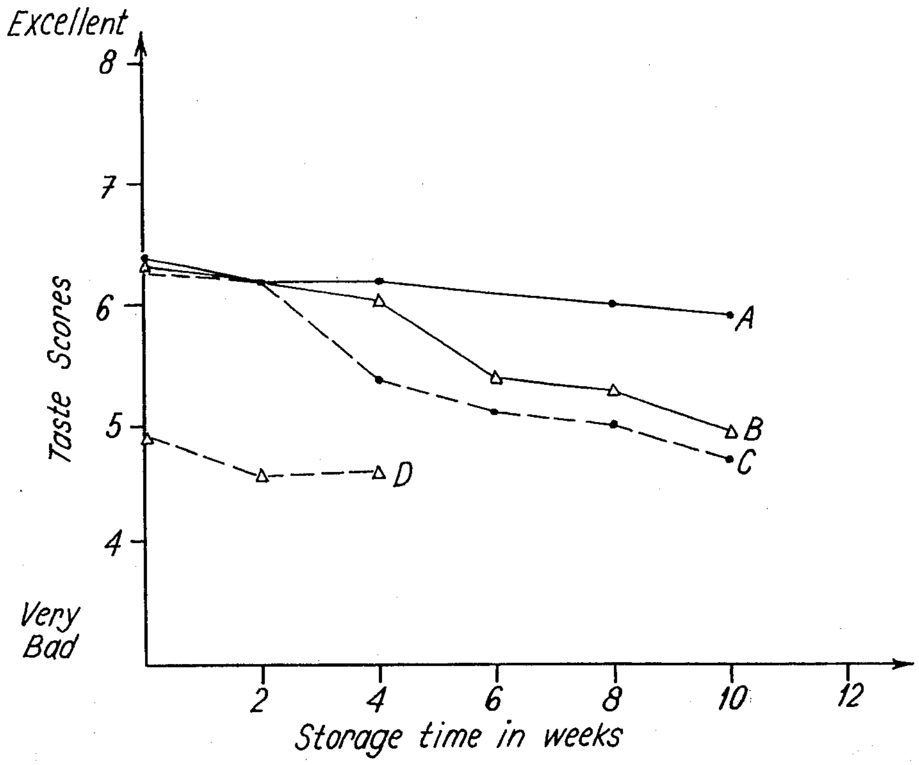

In FIG. 5 the results of the assessments are shown. It is clear from these results that process A gives the best results, and that process B is better than processes C and D, which are not according to the present invention.

What is claimed is:

1. A process for treating edible glyceride oil to improve its colour and its storage properties, in which the edible glyceride oil, in solution in a nonpolar solvent, said solution containing from 10–95% by weight of the solvent, is first contacted at a temperature between 0–60°C with a metal oxide or metalloid oxide adsorbent with an average pore size of between 30–2000 A selected from the group consisting of silicas and aluminas and mixtures thereof in a column containing the adsorbent, in a ratio of oil to adsorbent of 0.3:1 to 20:1, and the oil is subsequently treated with a bleaching earth after removal of the solvent from the oil.

2. A process according to claim 1, in which the oil is further subjected to a deodorizing treatment.

3. A process according to claim 1, in which the oil is subjected to an alkali refining before treatment with the adsorbent.

4. A process according to claim 1, in which the oil is an untreated crude oil and the adsorbent is silica gel.

* * * * *